(12) United States Patent
Park et al.

(10) Patent No.: US 10,554,968 B2
(45) Date of Patent: Feb. 4, 2020

(54) METHOD AND APPARATUS FOR INTER PREDICTION ON BASIS OF VIRTUAL REFERENCE PICTURE IN VIDEO CODING SYSTEM

(71) Applicant: LG Electronics Inc., Seoul (KR)

(72) Inventors: Seoungwook Park, Seoul (KR); Jaehyun Lim, Seoul (KR); Yongjoon Jeon, Seoul (KR); Eunyong Son, Seoul (KR)

(73) Assignee: LG Electronics Inc., Seoul (KR)

(*) Notice: Subject to any disclaimer, the term of this patent is extended or adjusted under 35 U.S.C. 154(b) by 63 days.

(21) Appl. No.: 15/580,873

(22) PCT Filed: Apr. 22, 2016

(86) PCT No.: PCT/KR2016/004209
§ 371 (c)(1),
(2) Date: Dec. 8, 2017

(87) PCT Pub. No.: WO2016/200043
PCT Pub. Date: Dec. 15, 2016

(65) Prior Publication Data
US 2018/0167610 A1    Jun. 14, 2018

Related U.S. Application Data

(60) Provisional application No. 62/173,925, filed on Jun. 10, 2015.

(51) Int. Cl.
*H04N 19/139* (2014.01)
*H04N 19/513* (2014.01)
(Continued)

(52) U.S. Cl.
CPC ......... *H04N 19/105* (2014.11); *H04N 19/139* (2014.11); *H04N 19/513* (2014.11); *H04N 19/70* (2014.11)

(58) Field of Classification Search
CPC ........ H04N 19/46; H04N 19/59; H04N 19/70; H04N 19/105; H04N 19/136;
(Continued)

(56) References Cited

U.S. PATENT DOCUMENTS

2010/0091845 A1* 4/2010 Jeon .................. H04N 19/597
375/240.12
2010/0215101 A1   8/2010 Jeon et al.
(Continued)

FOREIGN PATENT DOCUMENTS

KR    10-2014-0088592    7/2014

*Primary Examiner* — Patricia I Young
(74) *Attorney, Agent, or Firm* — Fish & Richardson P.C.

(57) ABSTRACT

An inter prediction method according to the present invention, which is performed by a decoding apparatus, comprises the steps of: configuring a reference picture set for a current picture; generating a virtual reference picture corresponding to an original reference picture in the reference picture set; deriving a motion vector for a current block in the current picture; and generating a prediction sample for the current block on the basis of the motion vector and the virtual reference picture. According to the present invention, the performance of inter prediction can be enhanced on the basis of a virtual reference picture having higher correlation with a current picture, and accordingly the amount of data allocated to a residual signal can be reduced and the overall coding efficiency can be improved.

12 Claims, 10 Drawing Sheets

(51) Int. Cl.
*H04N 19/70* (2014.01)
*H04N 19/105* (2014.01)

(58) Field of Classification Search
CPC .. H04N 19/139; H04N 19/176; H04N 19/513; H04N 19/597
USPC .................................................. 375/240.16
See application file for complete search history.

(56) References Cited

U.S. PATENT DOCUMENTS

2011/0243224 A1 10/2011 Su et al.
2013/0194505 A1 8/2013 Pahalawatta et al.
2014/0092991 A1 4/2014 Sullivan et al.

\* cited by examiner

METHOD AND APPARATUS FOR INTER PREDICTION ON BASIS OF VIRTUAL REFERENCE PICTURE IN VIDEO CODING SYSTEM

CROSS-REFERENCE TO RELATED APPLICATIONS

This application is a National Stage application under 35 U.S.C. § 371 of International Application No. PCT/KR2016/004209, filed Apr. 22, 2016, which claims the benefit of U.S. Application No. 62/173,925, filed on Jun. 10, 2015. The disclosures of the prior applications are incorporated by reference in their entirety.

BACKGROUND OF THE INVENTION

Field of the Invention

The present invention relates to a video coding technology, and more particularly to a method and apparatus for inter prediction on the basis of a virtual reference picture in a video coding system.

Related Art

Recently, the demand for high-resolution, high-quality video such as HD (High Definition) video and UHD (Ultra High Definition) video is growing in various fields. Higher-resolution, higher-quality video data leads to a relatively larger amount of information or bits transferred, compared to existing video data. Thus, storing video data by the medium of existing wired or wireless broadband connections or by using existing storage media increases transmission costs and storage costs.

Therefore, there is a need for a high-efficiency video compression technology in order to transmit, store, or reproduce high-resolution, high-quality video information.

SUMMARY OF THE INVENTION

A technical aspect of the present invention is to provide a method and apparatus for increasing video coding efficiency.

Another technical aspect of the present invention is to provide a method and apparatus for increasing inter prediction performance.

Yet another technical aspect of the present invention is to provide a method and apparatus for generating a virtual reference picture.

A further aspect of the present invention is to increase the accuracy of a prediction signal by using a virtual reference picture.

A further aspect of the present invention is to provide a method and apparatus for generating a virtual reference picture using homography information.

A further aspect of the present invention is to provide a method and apparatus for generating a virtual reference picture through filtering.

A further aspect of the present invention is to provide a method and apparatus for managing a virtual reference picture.

According to an exemplary embodiment of the present invention, there is provided an inter prediction method which is performed by a decoding apparatus. The inter prediction method includes: configuring a reference picture set for a current picture; generating a virtual reference picture corresponding to an original reference picture in the reference picture set; deriving a motion vector for a current block in the current picture; and generating a prediction sample for the current block on the basis of the motion vector and the virtual reference picture.

According to another exemplary embodiment of the present invention, there is provided a decoding apparatus which performs inter prediction. The decoding apparatus includes: a decoding unit that acquires information on an inter prediction mode for a current block from a bitstream; and a prediction unit that configures a reference picture set for a current picture, generates a virtual reference picture corresponding to an original reference picture in the reference picture set, derives a motion vector for a current block in the current picture, and generates a prediction sample for the current block on the basis of the motion vector and the virtual reference picture.

According to yet exemplary embodiment of the present invention, there is provided a video encoding method which is performed by an encoding apparatus. The video encoding method includes: configuring a reference picture set for a current picture; generating a virtual reference picture corresponding to an original reference picture in the reference picture set; deriving a motion vector for a current block in the current picture and a prediction sample on the basis of the virtual reference picture; deriving a residual sample on the basis of an original sample for the current block and the prediction sample; and encoding and outputting information on the motion vector and information on the residual sample.

According to a further exemplary embodiment of the present invention, there is provided an encoding apparatus which performs video encoding. The encoding apparatus includes: a prediction unit that configures a reference picture set for a current picture, generates a virtual reference picture corresponding to an original reference picture in the reference picture set, derives a motion vector for a current block in the current picture and a prediction sample on the basis of the virtual reference picture, and derives a residual sample on the basis of an original sample for the current block and the prediction sample; and an encoding unit that encodes and outputs information on the motion vector and information on the residual sample.

According to the present invention, the performance of inter prediction can be enhanced on the basis of a virtual reference picture which is more highly correlated with a current picture, and accordingly the amount of data allocated to a residual signal can be reduced and the overall coding efficiency can be improved.

DESCRIPTION OF EXEMPLARY EMBODIMENTS

Figure 1:
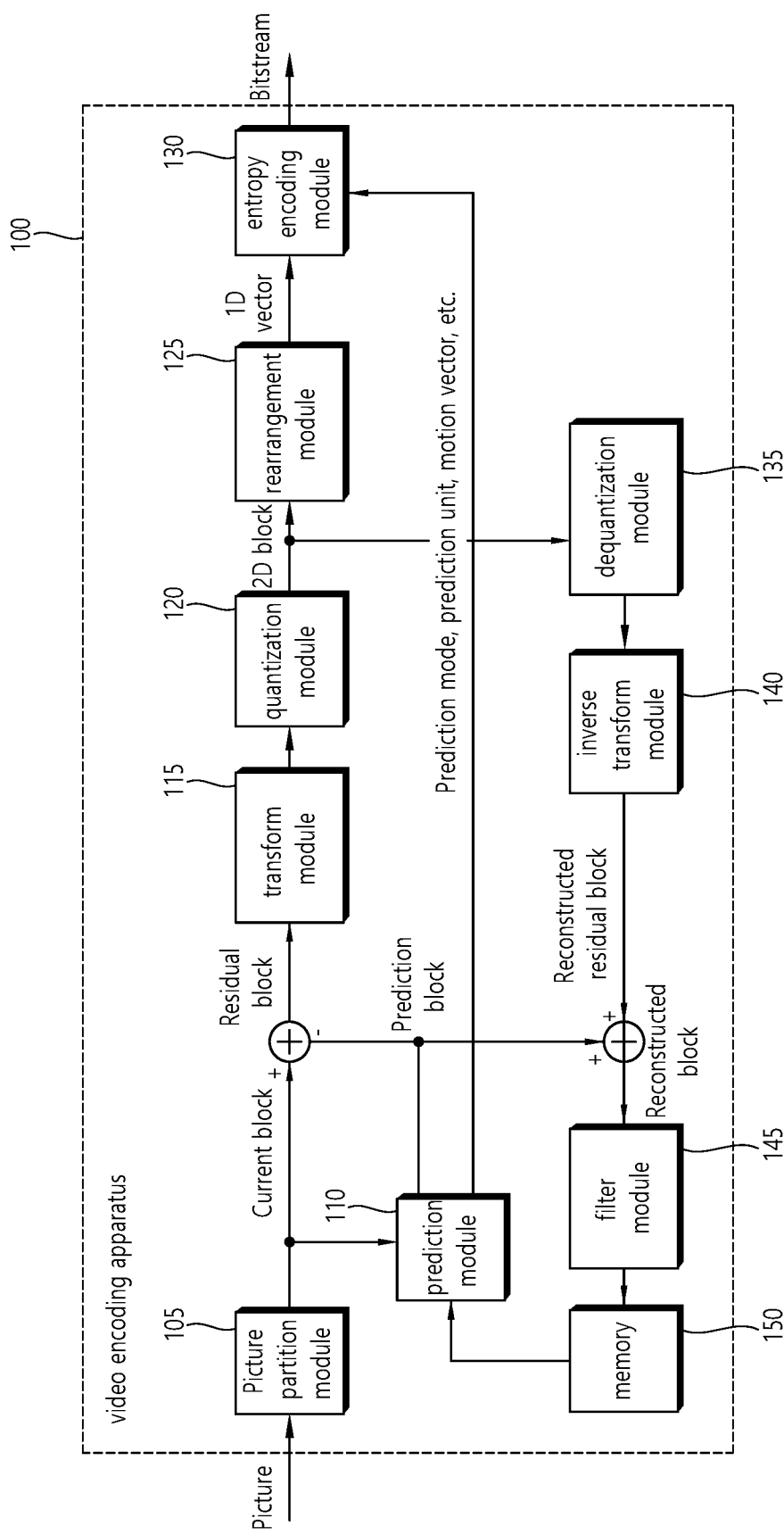
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filtering module 145, and a memory 150.

The picture partitioning module 105 divides an input picture into at least one processing unit block. In this case, a block as a processing unit may be a prediction unit PU, a transform unit TU, or a coding unit CU. A picture may consist of a plurality of coding tree units CTUs, and each CTU may be split into a quad-tree of CUs. A CU may be split into a quad-tree of CUs of deeper depth. PUs and TUs may be obtained from a CU. For example, a CU may be partitioned into PUs which are symmetrically or asymmetrically rectangular. Also, a CU may be partitioned into a quad-tree of TUs. A CTU may correspond to a CTB (coding tree block), a CU may correspond to a CB (coding block), a PU may correspond to a PB (prediction block), and a TU may correspond to a TB (transform block).

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block including a prediction sample or a prediction sample array. In the prediction module 110, the processing unit of a picture may be a CU, a TU, or a PU. The prediction module 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

Methods of inter prediction may include skip mode, merge mode, AMVP (Advanced Motion Vector Prediction), etc. In inter prediction, a reference picture for a PU may be selected, and a reference block corresponding to the PU may be selected. The reference block may be selected per integer pixel (or sample) or per fractional pixel (or sample). Next, a prediction block having the smallest residual signal with the PU and the smallest motion vector size is generated. In this specification, pixels, pels, and samples may be used interchangeably A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may be configured to entropy code the symbol according to a probability distribution based on the quantized transform values rearranged by the rearrangement module 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called the residual block in the block unit, and the residual signal can be called the residual sample in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoding module 130 may store therein a table for performing entropy encoding, such as a variable length coding/code (VLC) table. The entropy encoding module 130 may perform entropy encoding using the stored VLC table. Further, the entropy encoding module 130 derives a binarization method of a corresponding symbol and a probability model of a corresponding symbol/bin, and then performs entropy encoding using the derived binarization method or probability model.

The entropy encoding module 130 may give a predetermined change to a parameter set or syntaxes to be transmitted, if necessary.

The dequantization module 135 dequantizes the values transform coefficients quantized by the quantization module 120. The inverse transform module 140 inversely transforms the values dequantized by the dequantization module 135.

The residual value or residual sample or residual sample array generated by the dequantization module 135 and the inverse-transform module 140, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular module reconstructed block creating module that creates a reconstructed block.

The filtering module 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filtering module 145 may not perform a filtering operation on the reconstructed block used in the inter prediction.

The memory 150 may store the reconstructed block or picture calculated by the filtering module 145. The reconstructed block or picture stored in the memory 150 may be supplied to the prediction module 110 that performs the inter prediction.

Figure 2:
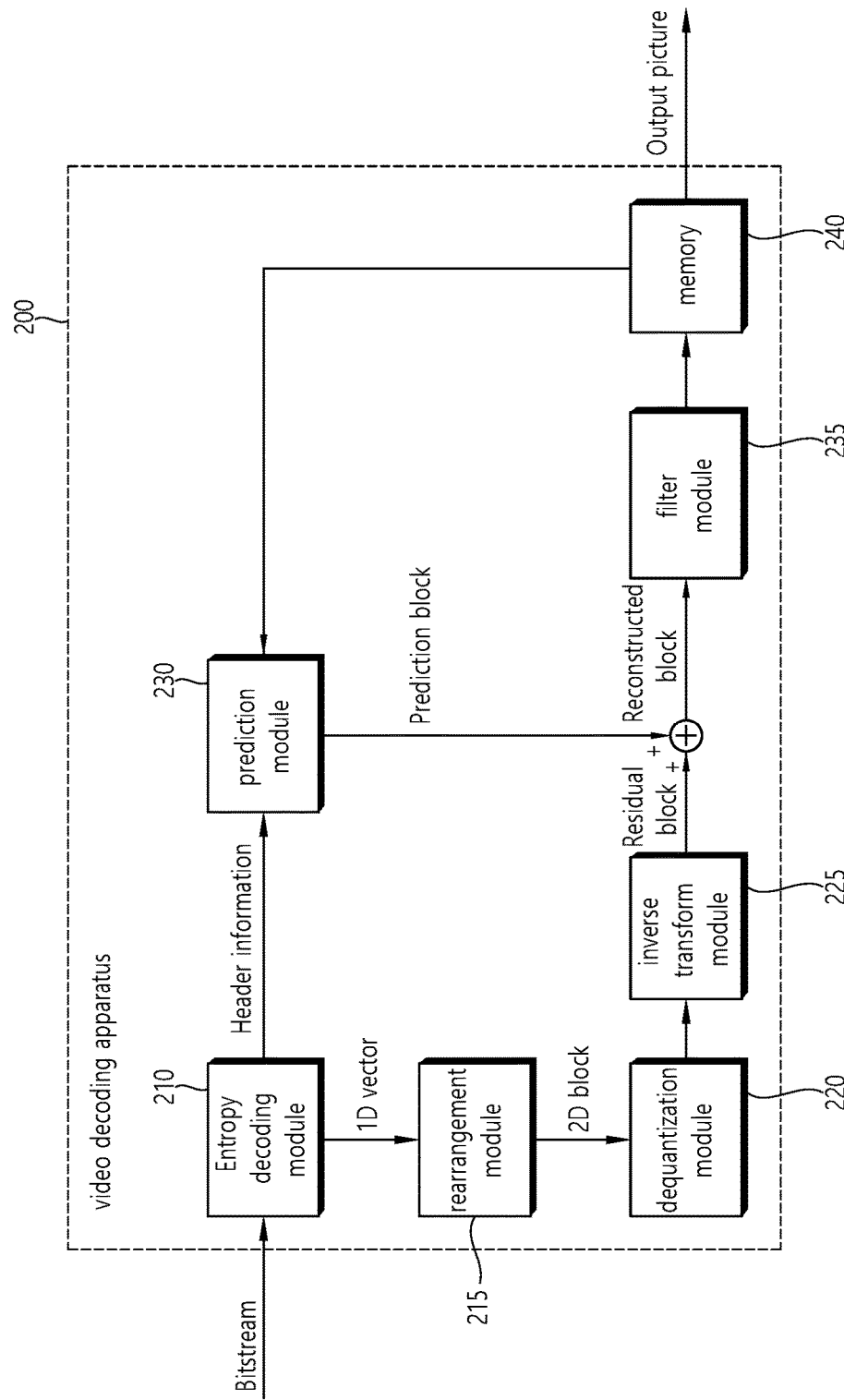
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filtering module 235, and a memory 240.

When a video bitstream is input from the video encoder, the input bitstream may be decoded on the basis of the order in which video information is processed by the video encoder.

The entropy decoding module 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoding module 210 may perform decoding using the same VLC table as the encoder used in the encoder. Further, when CABAC is used to perform entropy encoding in a video encoder, the entropy decoding module 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder.

The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 generates a prediction block including a prediction sample or a prediction sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter prediction mode, the prediction module 230 may be configured to perform inter prediction on a current PU based on information included in at least one picture of a previous picture or a subsequent picture to the current picture.

In this connection, information about the motion information necessary for inter prediction of the current PU provided in the video encoder, such as motion vector and reference picture index may be deduced via checking the skip flag and merge flag received from the encoder.

The prediction module 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In an example, when the merge mode is applied, the encoder and decoder generate a merge candidate list using the motion vector of a reconstructed spatial neighboring block and/or a motion vector corresponding to a Col block as a temporal neighboring block. In the merge mode, the motion vector of a candidate block selected from the merge candidate list is used as the motion vector of the current block. The encoder may transmit to the decoder a merge index indicating the candidate block with the optimal motion vector selected from among the candidate blocks included in the merge candidate list. In this connection, the decoder may derive the motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor (MVP), encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using motion information of a neighboring block and derive the motion vector for the current block using a residual received from the encoder. The decoder may generate a prediction sample (or prediction sample array) for the current block based on the derived motion vector and the reference picture index information received from the encoder.

The decoder may generate a reconstructed sample (or reconstructed sample array) by adding the prediction sample (or prediction sample array) and a residual sample (residual sample array) obtained from transform coefficients transmitted from the encoder. Based on this, a reconstructed block and a reconstructed picture may be generated.

In the above-described AMVP and merge modes, motion information of the reconstructed neighboring block and/or motion information of the Col block may be used to derive motion information of the current block.

In the skip mode, which is one of the other modes used for inter prediction, neighboring block information may be used for the current block as it is. Therefore, in the case of skip mode, the encoder does not transmit syntax information such as the residual to the decoder in addition to information indicating which block's motion information to use as the motion information for the current block.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoding module 210, the rearrangement module 215, the dequantization module 220, the inverse transform module 225, the prediction module 230, the filtering module 235 and the memory 240 which are included in the decoding apparatus 200, for example, the entropy decoding module 210, the rearrangement module 215, the dequantization module 220, the inverse transform module 225, the prediction module 230, the filtering module 235, and so on may be expressed as a decoder or a decoding unit that is distinguished from other elements.

In addition, the decoding apparatus 200 may further include a parsing unit not shown in the drawing that parses information related to the encoded images included in a bitstream. The parsing unit may include the entropy decoding module 210, and may be included in the entropy decoding module 210. Such a parsing unit may also be implemented as an element of the decoding unit.

When inter prediction is used as described above, the motion vector for the current block may be derived, and prediction samples for the current block may be derived using reconstructed samples of a reference block the motion vector indicates on a reference picture.

Specifically, in the merge mode, the MV of the best merge candidate in a merge candidate list generated based on candidate blocks is used as the MV for the current block. The encoder encodes merge index information indicating the merge candidate selected from the merge candidate list and transmits it to the decoder in a bitstream.

The decoder may derive the MV of a merge candidate block, selected from the merge candidate list based on the merge index information transmitted from the encoder, as the MV for the current block. The encoder may derive a reference block on a reference picture based on the MV of the current block, and use the reference block as a prediction block for the current block. That is, the samples in the reference block may be used as prediction samples for the current block.

Specifically, in the AMVP mode, the best MVP for the current block is selected from an MVP candidate list including motion vector predictor (MVP) candidates derived from candidate blocks. In this case, the encoder derives the best MVP from the MVP candidate list based on the MV for the current block derived by performing motion estimation, and calculates the MVD by subtracting the MVP from the MV. The encoder encodes MVP index information indicating which MVP candidate among the MVP candidates included in the MVP candidate list is the MVP for the current block and MVD information indicating the x-axis value and y-axis value of the calculated MVD and transmits them to the decoder The decoder may derive the MVP for the current block from the MVP candidate list based on the MVP index information and MVD information transmitted from the encoder, and derive the MV for the current block by adding the MVD to the derived MVP. Also, the decoder may derive a reference block on a reference picture based on the MV for the current block and use the reference block as a prediction block for the current block. That is, the samples in the reference block may be used as prediction samples for the current block.

The decoder may receive information on residual samples from the encoder and generate residual samples. The information on residual samples may include information on transform coefficients. Specifically, for example, the decoder may generate a residual block (or residual samples) by receiving transform coefficients in a bitstream from the encoder and inversely transforming the transform coefficients. Here, a residual sample may represent the difference between an original sample and a prediction sample, and a residual block may represent the difference between an original block including original samples and a prediction block including prediction samples.

Accordingly, higher prediction performance can reduce the amount of data for residual signals, thereby improving the overall coding efficiency.

According to the present invention, in order to reduce the amount of data for residual signals by increasing the performance of motion estimation and motion compensation, a virtual reference picture may be generated and used which has higher similarity to a current picture (or which is more useful in terms of prediction performance) than a general reference picture. Through this, video compression rates can be improved.

Reference pictures are required for inter-picture coding, i.e., inter prediction. In general, existing decoded pictures (i.e., reconstructed pictures that are decoded earlier than the current picture) are temporarily stored in a DPB (decoded picture buffer) so as to be used as reference pictures for the current picture or other pictures or so as to be output through a display device. The DPB may be included in the memory of the encoder/decoder described above. Some of the reconstructed pictures stored in the DPB may be used as reference pictures for the current picture.

Figure 3:
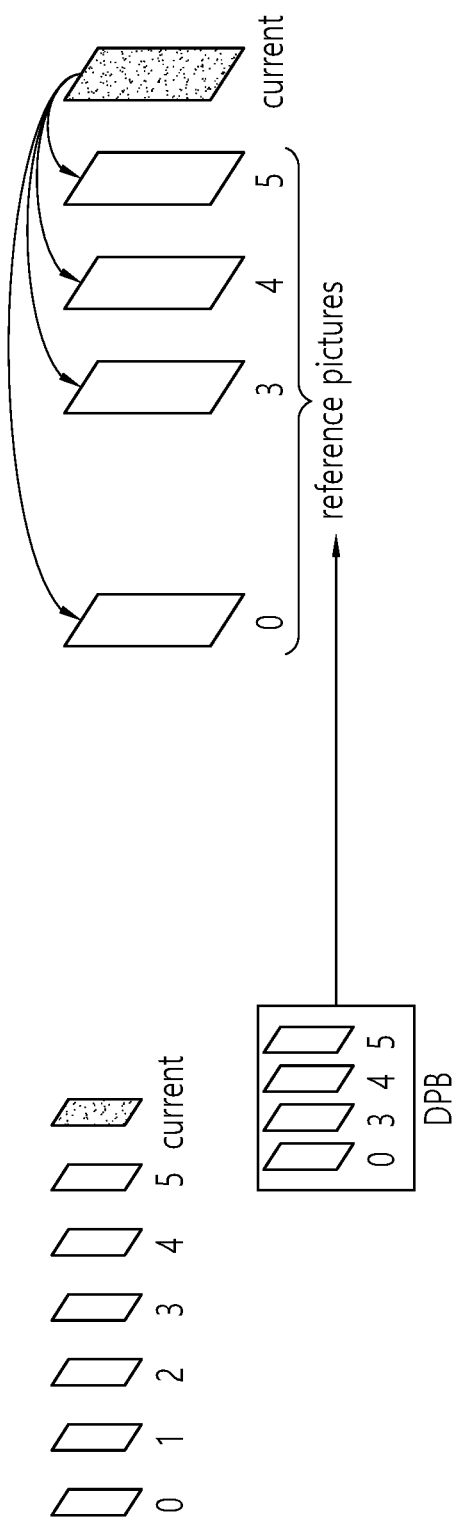
FIG. 3 illustrates by way of example a DPB and reference pictures for inter prediction.

FIG. 3 illustrates by way of example a DPB and reference pictures for inter prediction.

Referring to FIG. 3, 0, 1, 2, 3, 4, and 5 denote the display order of decoded pictures. At the instant the current picture is decoded, varied numbers of reference pictures may be used depending on the DPB size allowed by the decoder. FIG. 3 depicts an example of using the pictures 0, 3, 4, and 5 as reference pictures for the current picture.

On the encoder side, if the correlation between the current picture and the reference pictures 0, 3, 4, and 5 is considerably low (even with the motion vector considered), it is highly likely that intra prediction, which is a prediction within the current picture, will be used instead of inter prediction. Though it varies from case to case, intra prediction generally requires higher costs than inter prediction. Thus, intra prediction has lower coding rates than inter prediction. Examples of the considerably low correlation between the current picture and reference pictures may include a complicated motion between pictures that cannot be expressed by a translation motion, a severe difference between focusing and defocusing, and an abrupt change in brightness.

In view of this, in the present invention, a virtual reference picture (VRP) highly correlated with the current picture may be temporarily generated using various methods by taking the correlation between reference pictures and the current picture, and may be used in the inter prediction step for the current block. Here, an existing reference picture may be referred to as an original reference picture to distinguish it from the virtual reference picture. In this case, the generated virtual reference picture is not stored in the DPB but may be removed after the current picture is encoded/decoded. Alternatively, the generated virtual reference picture may be stored in the DPB and then marked as "unused for reference" and removed according to a series of procedure steps after the current picture is encoded/decoded.

Figure 4:
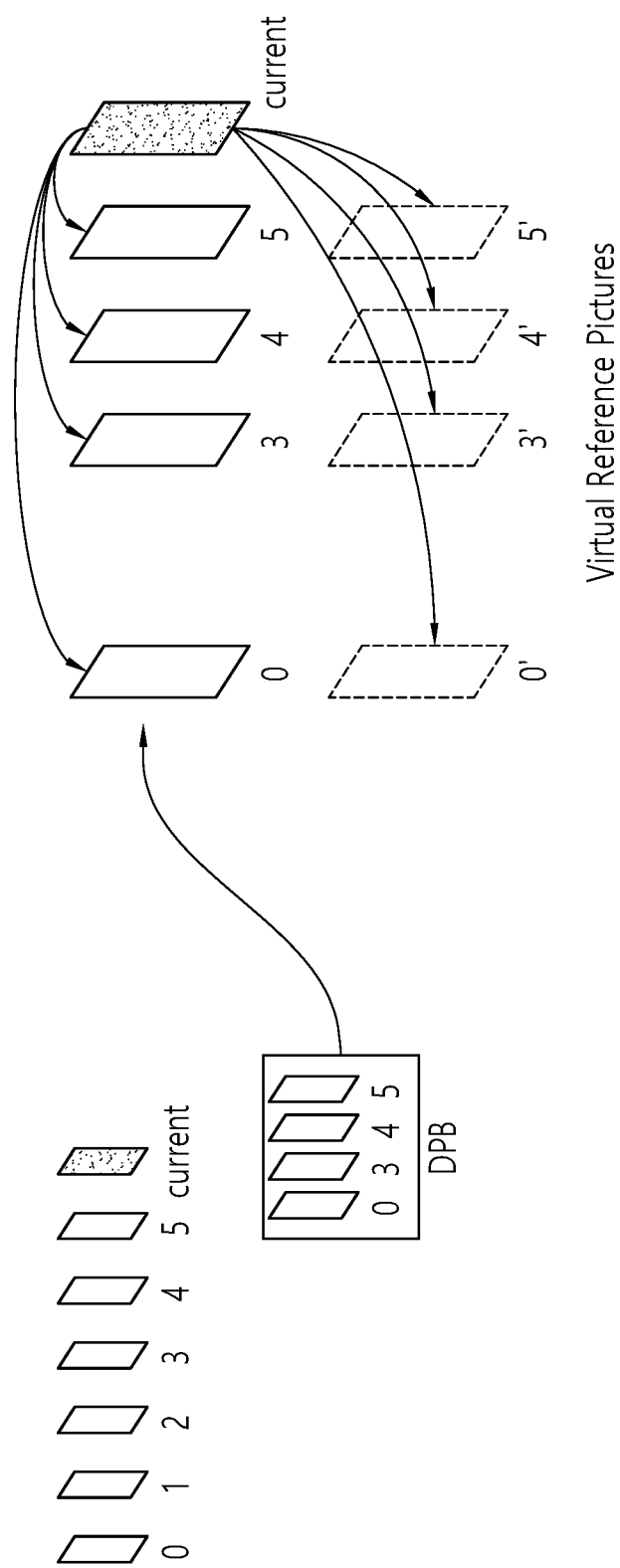
FIG. 4 illustrates by way of example the concept of a virtual reference picture.

FIG. 4 illustrates by way of example the concept of a virtual reference picture.

Referring to FIG. 4, the pictures 0, 3, 4, and 5, which are original reference pictures, are reference pictures which are constructed according to an RPS (reference picture set) in the DPB, and the pictures 0', 3', 4', and 5' are virtual reference pictures that are temporarily generated from the original reference pictures to increase the efficiency of compression of the current picture. These virtual reference pictures may be removed from the memory after the current picture is encoded/decoded and therefore are not to be used when encoding/decoding other pictures. Benefits of using these virtual reference pictures are that: i) virtual reference pictures of various types can be temporarily generated and used, ii) the compression efficiency (i.e. coding efficiency) of the current picture can be increased by using virtual reference pictures highly correlated with the current picture, and iii) an increase in the total number of reference pictures due to the virtual reference pictures does not increase DPB memory usage. Accordingly, based on these benefits, coding efficiency can be increased without substantially affecting the existing system architecture.

Figure 5:
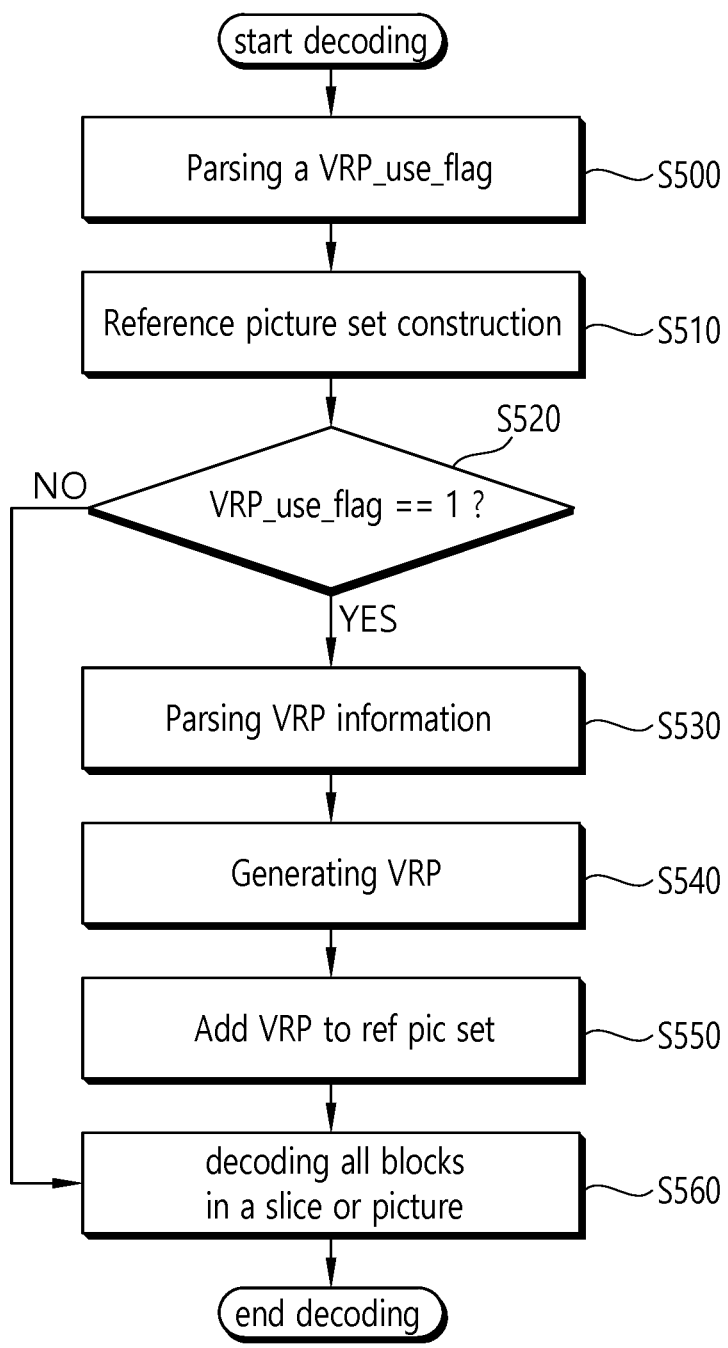
FIG. 5 illustrates a decoding procedure that takes virtual reference pictures into account.

FIG. 5 illustrates a decoding procedure that takes virtual reference pictures into account.

Referring to FIG. 5, the decoder parses VRP_use_flag (S500). The VRP_use_flag indicates whether to use a virtual reference picture VRP or not when decoding. The VRP_use_flag is a syntax element, and may be transmitted in various parameter set syntaxes. like a video parameter set (VPS) syntax, a sequence parameter set (SPS) syntax, a picture parameter set (PPS) syntax, or a tile parameter set (TPS) syntax. These parameter sets may be received in a bitstream, and the decoder may parse and acquire the VRP_use_flag from the bitstream. The bitstream may be received from the encoder through a network or storage medium.

The decoder constructs a reference picture set RPS for inter prediction (S510). The RPS may include original reference pictures for inter prediction of the current picture. As descried above, the original reference pictures may be reconstructed (or decoded) pictures that are decoded earlier than the current picture.

The decoder checks whether the value of the VRP_use_flag is 1 or not (S520). In S520, if the value of the VRP_use_flag is 1, the decoder parses VRP information from the bitstream (S530), and generates a VRP based on the VRP information (S540). The VRP information is information required for the decoder to generate the VRP, which may include homography matrix-related information or illumination compensation information. The decoder may generate one or more VRPs based on the VRP information.

The decoder adds the generated VRP to the RPS (S550), and decodes the blocks in the current slice or current block based on the RPS with the VRP added thereto (S560). Here, the decoding of the blocks may include generating reconstructed samples for the corresponding blocks. In this case, the prediction units PUs included in the current slice or current picture may be decoded using the VRP. In this case, when the decoding of the slice or picture is completed, the temporarily generated VRP may be removed from the memory and the decoding procedure may be then completed.

Meanwhile, in the step S520, if the value of the VRP_use_flag is not 1, the decoder decodes the blocks in the current slice or current picture based on the RPS with no VRP added thereto (S560).

Using the above method, the performance of inter prediction can be increased based on a virtual reference picture, the amount of data allocated to residual signals can be reduced, and the overall coding efficiency can be improved.

Meanwhile, inter prediction may be performed per PU. That is, the motion vector for a PU as the current block may be obtained, and prediction samples for the current block may be generated based on reconstructed samples of a reference block the motion vector indicates on an original/virtual reference picture indicated by a reference picture index. As described above, one or a plurality of PUs may be partitioned from a CU. In this case, whether to use inter prediction or intra prediction may be determined per CU, for example. When using inter prediction for the CU, whether to use a specific inter prediction mode, e.g., the merge mode or AMVP mode, may be determined per PU. If the inter prediction mode for the current block is the merge mode, the reference picture index for the current block may be obtained from a neighboring block. Also, if the inter prediction mode for the current block is the AMVP mode, the reference picture index for the current block may be signaled from the encoder. The reference picture index may indicate an original/virtual reference picture used for inter prediction of the current block.

In this case, the reference picture index for a VRP may be set as follows.

In an example, the reference picture index for a VRP may have a higher value than the reference picture indices for original reference pictures. In this case, the original reference pictures may be indexed first based on a POC (picture order count), and then VRPs may be indexed. For example, if the reference picture indices of original reference pictures 0, 3, 4, and 5 for the current block in FIG. 4 are 3, 2, 1, and 0, respectively, the reference picture indices of VRPs 0', 3', 4', and 5' may be assigned 7, 6, 5, and 4. Thus, when inter prediction for the current block is performed using one of the VRPs 0', 3', 4', and 5', one of the reference picture indices 7, 6, 5, and 4 may be indicated for the current block.

In another example, no reference picture index may be allocated to a VRP, but the VRP may be indicated by signaling an individual flag for each PU. For example, a pu_VRP_use_flag may be transmitted per PU, which may show whether the value of a reference picture index indicates an original reference picture or virtual reference picture. For example, if the value of the pu_VRP_use_flag is 0, the reference picture index may have a certain value indicating an original reference picture, and if the value of the pu_VRP_use_flag is 1, the reference picture index may have a certain value indicating the virtual reference picture. For example, it can be assumed that the reference picture index of the original reference picture 5 in FIG. 4, is 0. In this case, if the value of pu_VRP_use_flag is 0, the reference picture index 0 may indicate the original reference picture 5, and if the value of pu_VRP_use_flag is 1, the reference picture index 0 may indicate the virtual reference picture 5'.

Meanwhile, the above-described VRP information for generating a VRP may include the following information, for example.

In an example, the encoder may generate a VRP based on a homography transform, in which case homography transform-related information may be included in the VRP information as in the following equation:

$$\begin{bmatrix} x' \\ y' \\ 1 \end{bmatrix} = H \begin{bmatrix} x \\ y \\ 1 \end{bmatrix} = \overbrace{\begin{bmatrix} h_{11} & h_{12} & h_{13} \\ h_{21} & h_{22} & h_{23} \\ h_{31} & h_{32} & 1 \end{bmatrix}}^{\text{homography matrix}} \begin{bmatrix} x \\ y \\ 1 \end{bmatrix} \quad \text{[Equation 1]}$$

In this case, a total of eight coefficients h11 to h32 in the homography matrix may be encoded into the VRP information and transmitted to the decoder. In this case, the decoder may reconstruct the homography matrix based on the coefficients, and generate a virtual reference picture corresponding to an original reference picture by using the samples for each x-y coordinate in the original reference picture.

Alternatively, the coefficients are not directly signaled but positional information mapped using the following mapping relationship between feature points may be transmitted.

Figure 6:
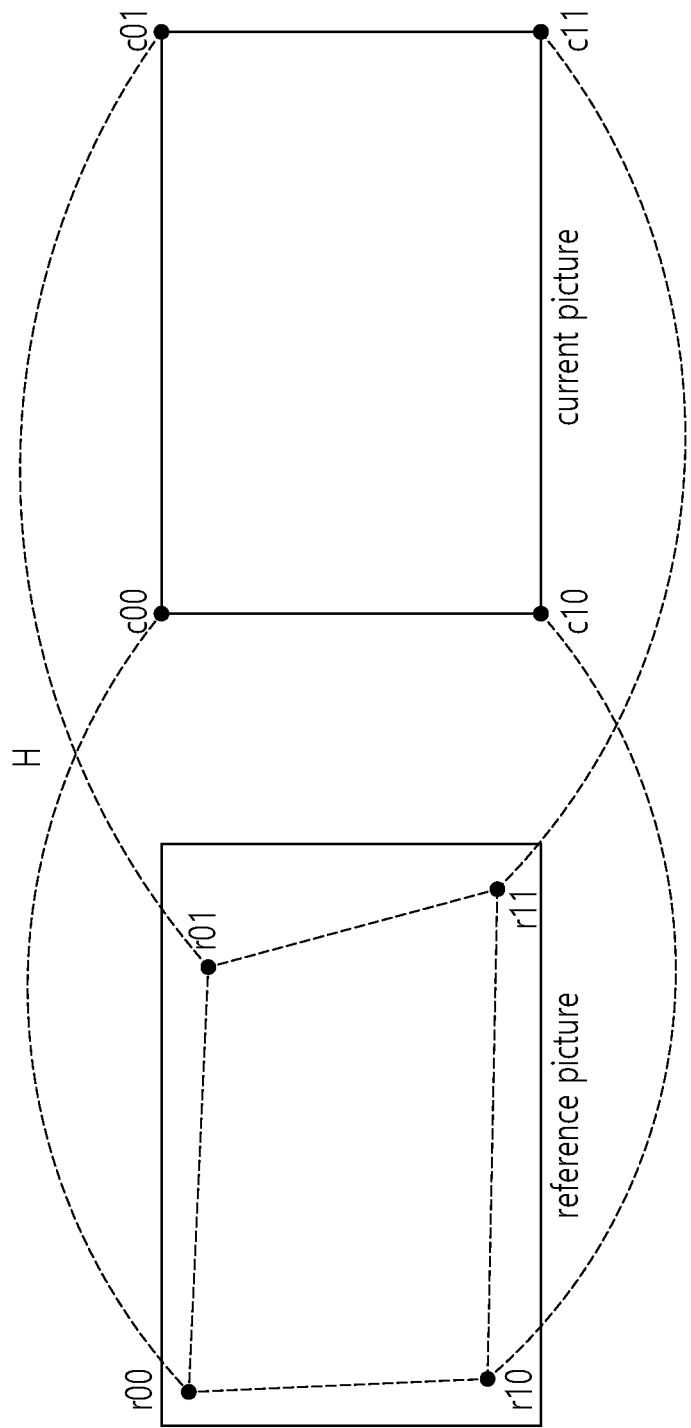
FIG. 6 illustrates the mapping relationship between a current picture and an original reference picture according to a homography matrix.

FIG. 6 illustrates the mapping relationship between a current picture and an original reference picture according to a homography matrix.

Referring to FIG. 6, c00 to c11 denote the positions of the four corners of the current picture. For example, if the current picture is an image with 1920×1080 resolution, c00=(0, 0), c01=(1919, 0), c10=(0, 1079), c11=(1919, 1079). r00 to r11 correspond to c00 to c11. r00 to r11 denote the points obtained by performing a homography transform on c00 to c11 by the homography matrix.

Accordingly, by transmitting positional information of r00 to r11 instead of the homography matrix coefficients, the decoder may generate a homography matrix based on the positional information.

In this case, the positional information of r00 to r11 is not encoded and transmitted directly, but instead the differential value between c00 to r00, the differential value between c01 and r01, the differential value between c02 and r02, and the differential value between c03 and r03 are coded. This can reduce the amount of information coded, thereby enabling efficient transmission of VRP information.

While, in the above-described example, corresponding points in an original reference picture are obtained with respect to a current picture, this is only an illustration, and rather positional information may be transmitted which informs about which positions on the current picture the points corresponding to the four corners of the original reference picture mapped by the homography matrix.

The encoder and the decoder may generate a VRP based on the homography-related information. For example, the encoder and the decoder may generate the VRP through the following procedure based on a derived homography matrix.

Figure 7:
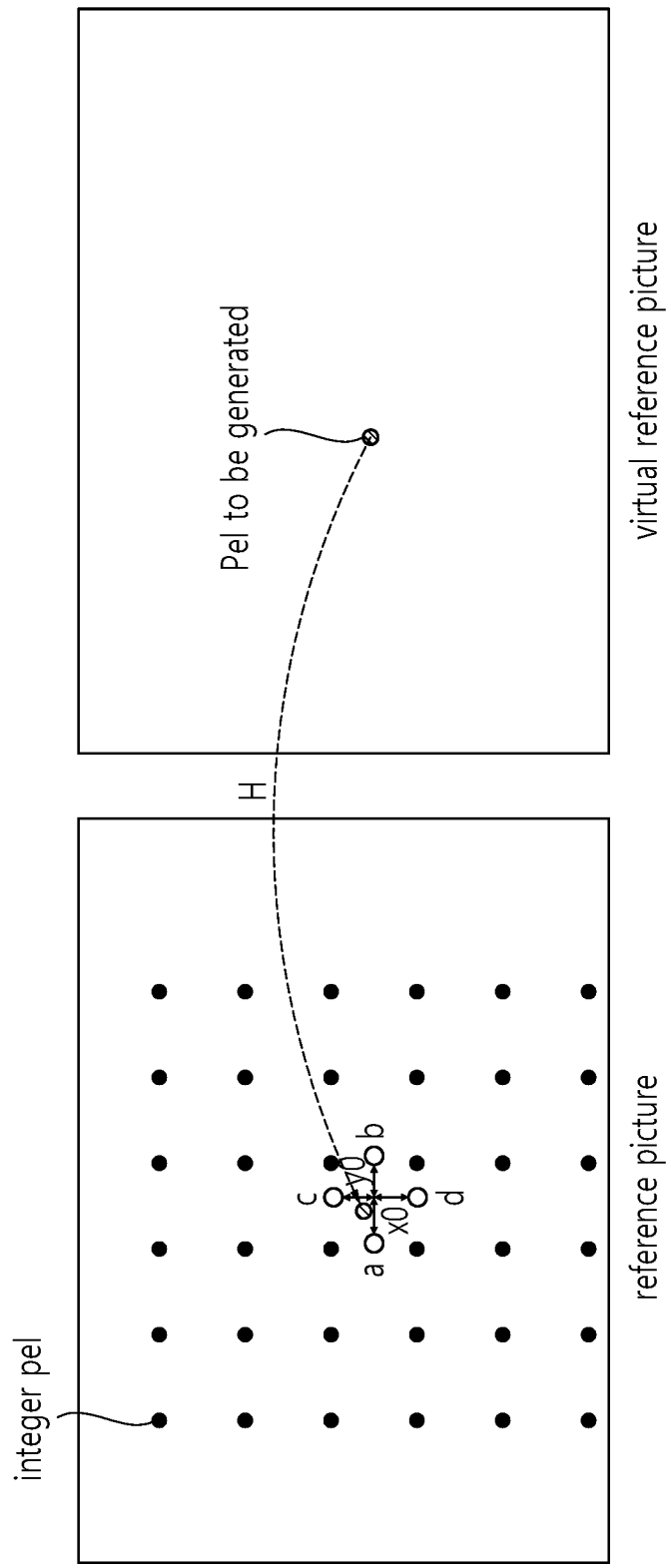
FIG. 7 illustrates an example of a virtual reference picture generation procedure according to the present invention.

FIG. 7 illustrates an example of a virtual reference picture generation procedure according to the present invention.

Referring to FIG. 7, if a pel to be generated is at or closest to a fractional pel position, the 'pel to be generated' is generated from the interpolation of integer pels neighboring the fractional pel position. In this case, various interpolation methods may be used. In an example, the 'pel to be generated' may be generated by 2D bi-cubic filtering using 36 integer pels neighboring the fractional pel position. Alternatively, half pels (a, b, c, and d of FIG. 7) may be generated by 1D N tab filtering, and then a pel may be generated at a more fractional pel position by bi-linear filtering. For example, when generating the fractional pel by bi-linear filtering using a, b, c, and d, the value of the fractional pel may be calculated by the following equation:

$$\text{Pel}=(a*(1-x0)+Vx0+c*(1-y0)+d*y0)/(a+b+c+d) \quad \text{[Equation 2]}$$

where Pel is the value of the fractional pel (or the value of the pel to be generated), x0 is the distance from the fractional pel position to the half pel a, and y0 is the distance from the fractional pel position to the half pel b.

In another example, the encoder may generate a VRP based on illumination compensation, in which case the VRP information may include information on illumination compensation or change. For example, the illumination compensation equation may be expressed as follows:

$$Y=a*X+b \quad \text{[Equation 3]}$$

where Y is luminance/chrominance information of the current picture, and X is luminance/chrominance information of the original reference picture. a and b correspond to weight and offset, respectively. a and b may be values that represents the entire picture, or may be values that vary for each region. For example, a and b may be obtained based on the relationship between reference blocks that are matched by taking into account PUs and motion vectors. In this case, a and b may be obtained based on the average or median value of weights and offsets of all the PUs in the picture or region.

Meanwhile, if the VRP is generated by applying high pass filtering or low pass filtering to the original reference picture, filter information related to the VRP may be included in the VRP information.

Meanwhile, a generated VRP may be inserted into various positions of a generated reference picture set VPS or reference picture list. For example, if the VRP can give far better inter prediction efficiency than original reference pictures, the VRP may be inserted into the first position (i.e., reference picture index 0) of the reference picture set or reference picture list. Contrariwise, if the original reference pictures are more useful and highly likely to be selected, the VRP may be positioned at the last position of the reference picture set or reference picture list in order to reduce the amount of bits consumed for the reference picture indices. The construction of the reference picture set or reference picture list may be determined by the encoder, and indicated at the picture level or slice level.

Figure 8:
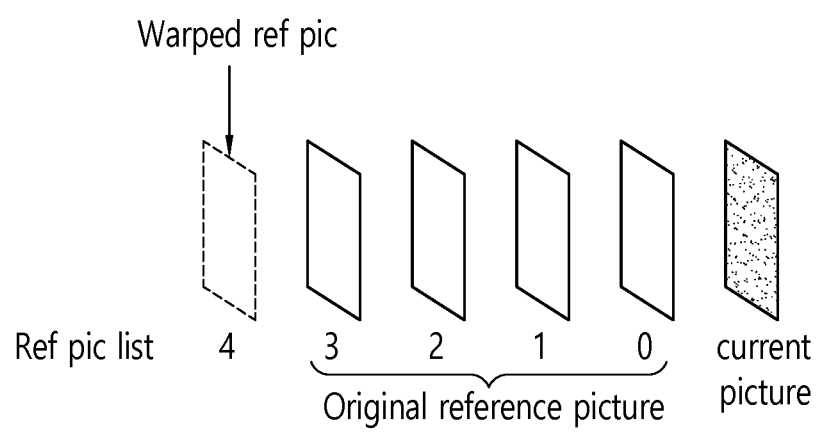
FIG. 8 illustrates the construction of a reference picture set or reference picture list.

FIG. 8 illustrates the construction of a reference picture set or reference picture list.

Referring to FIG. 8, a warped ref pic corresponds to the above-described virtual reference picture. As depicted in the drawing, the virtual reference picture may be inserted into the last position of the reference picture set or reference picture list (or after the original reference pictures), or may be inserted into the first position of the reference picture set or reference picture list.

In the case that the virtual reference picture is inserted into a fixed position, no additional information needs to be transmitted. However, to improve the coding performance, the encoder may derive the best position to insert the virtual reference picture into and transmit positional information of the virtual reference picture to the decoder after performing a performance evaluation through encoding by inserting the virtual reference picture into various positions of the reference picture set or reference picture list. The decoder may insert the virtual reference picture into the reference picture set or reference picture list based on the received positional information of the virtual reference picture.

The positional information of the virtual reference picture may be transmitted in the form of a syntax element, and the syntax element may be transmitted at the slice level or picture level.

For example, the positional information of the virtual reference picture may correspond to a VRP_pos_in_rps (or VRP_pos_in_rpl) syntax element. The syntax element indicates the position of the virtual reference picture in the reference picture set (or list). If the value of the above-described VRP_use_flag is 0, the VRP_pos_in_rps (or VRP_pos_in_rpl) syntax element may not be transmitted.

Figure 9:
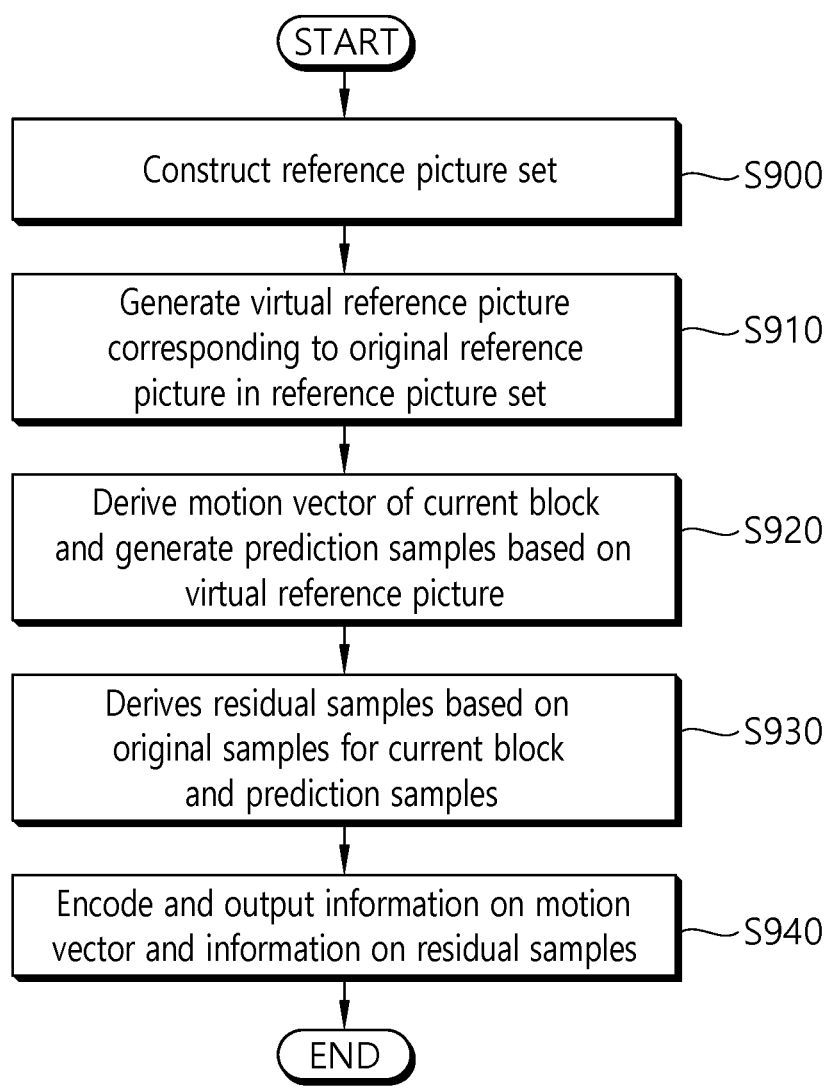
FIG. 9 schematically illustrates an example of a video coding method according to the present invention.

FIG. 9 schematically illustrates an example of a video coding method according to the present invention. The method disclosed in FIG. 9 may be performed by the encoder.

Referring to FIG. 9, the encoder constructs a reference picture set RPS for a current picture (S900). The reference picture set may include, as original reference pictures, reconstructed (or decoded) pictures that are decoded earlier than the current picture.

The encoder generates a virtual reference picture corresponding to an original reference picture in the reference picture set (S910).

In an example, the virtual reference picture may be generated based on a homography transform for the original reference picture. The homography transform is performed based on a homography matrix, and the homography matrix may be derived based on the positional relationship between four corner pixels of the current picture and the corresponding pixels of the original reference picture. In this case, the encoder may encode VRP information including positional information of the corresponding pixels and output it in a bitstream. In this case, for example, when the first one of the four corner pixels is denoted by P1 and the first corresponding pixel corresponding to the first corner pixel is denoted by P2, the positional information of the corresponding pixels may include the differential value between P1 and P2. Meanwhile, the VRP information may include the coefficients of the homography matrix.

In another example, the virtual reference picture may be generated based on illumination compensation for the original reference picture. In this case, the VRP information may include a weight and offset for the illumination compensation.

Based on the virtual reference picture, the encoder derives the motion vector of a current block in the current picture and generates prediction samples (a prediction sample array) (S920). In this case, the encoder determines whether inter prediction is applied to the current block, and if so, may determine whether the merge mode or AMVP mode is applied as a specific inter prediction mode. The encoder may derive a reference block most similar to the current block based on motion estimation, etc., and derive the best motion vector for the current block.

The encoder may construct a reference picture list including the virtual reference picture. The encoder may set a reference picture index to indicate the virtual reference picture on the reference picture list. If the inter prediction mode for the current block is the AMVP mode, the encoder may encode a syntax element for the reference picture index and output it in a bitstream.

The reference picture list may include a plurality of original reference pictures and the virtual reference picture. In this case, the index of the virtual reference picture may have a lower value than the indices of the original reference picture. For example, the reference picture index indicating the virtual reference picture may be 0. Alternatively, the index of the virtual reference picture may have a higher value than the indices of the original reference pictures, based on RD costs.

Meanwhile, the encoder may set the value of a pu_VRP_use_flag syntax element, and output the pu_VRP_use_flag syntax element in the bitstream. The reference picture list may include the original reference picture and the virtual reference picture. In this case, if the value of the pu_VRP_use_flag syntax element is 1, the reference picture index may indicate the virtual reference picture, and if the pu_VRP_use_flag syntax element is 0, the reference picture index may indicate the original reference picture.

The encoder derives residual samples (or a residual sample array) for the current block based on the original samples for the current block and the prediction samples (S930).

The encoder encodes and outputs information on the motion vector and information on the residual samples (S940). The encoder may encode the information and output it in a bitstream. The bitstream may be transmitted to the decoder through a network or storage medium. If the inter prediction mode for the current block is the merge mode, the information on the motion vector may include a merge index. If the inter prediction mode for the current block is the AMVP mode, the information on the motion vector may include an mvp index and an MVD (motion vector) difference. The information on the residual samples may include transform coefficients for the residual samples.

Although not shown, the encoder may set the value of a VRP_use_flag syntax element based on whether the virtual reference picture is available or not, and output the VRP_use_flag syntax element in the bitstream.

Moreover, the encoder may set the value of a VRP_post_in_rps syntax element indicating the position of the virtual reference picture in the reference picture set, and output the VRP_post_in_rps syntax element in the bitstream. The VRP_post_in_rps syntax element may be transmitted only when the value of the VRP_use_flag syntax element is 1.

Figure 10:
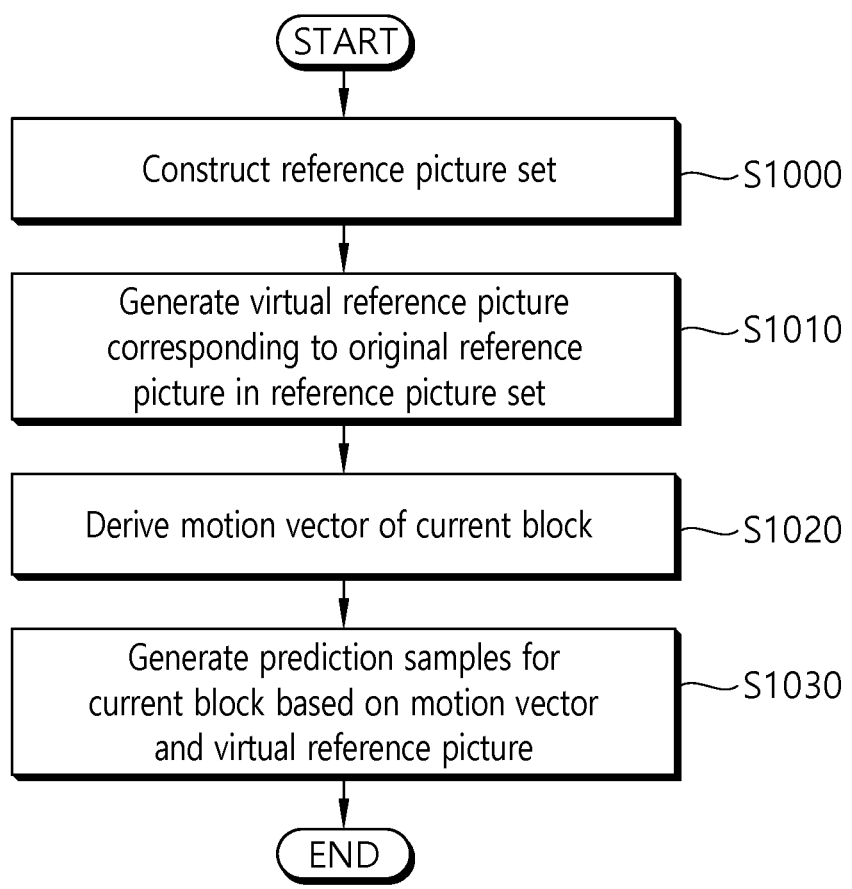
FIG. 10 schematically illustrates an example of an inter prediction method according to the present invention.

FIG. 10 schematically illustrates an example of an inter prediction method according to the present invention. The method disclosed in FIG. 10 may be performed by the decoder.

Referring to FIG. 10, the decoder constructs a reference picture set for a current picture (S1000). The reference picture set may include, as original reference pictures, reconstructed (or decoded) pictures that are decoded earlier than the current picture.

The decoder generates a virtual reference picture corresponding to an original reference picture in the reference picture set (S1010). The decoder may generate the virtual reference picture implicitly according to the same criterion as the encoder, or may acquire VRP information from the bitstream and generate the virtual reference picture based on the VRP information.

In an example, the virtual reference picture may be generated based on a homography transform for the original reference picture. The homography transform is performed based on a homography matrix, and the homography matrix may be derived based on the positional relationship between four corner pixels of the current picture and the corresponding pixels of the original reference picture. In this case, the VRP information may include positional information of the corresponding pixels. In this case, for example, when the first one of the four corner pixels is denoted by P1 and the first corresponding pixel corresponding to the first corner pixel is denoted by P2, the positional information of the corresponding pixels may include the differential value between P1 and P2. Alternatively, the VRP information may include the coefficients of the homography matrix.

In another example, the virtual reference picture may be generated based on illumination compensation for the original reference picture. In this case, the VRP information may include the weight and offset for the illumination compensation.

Meanwhile, the decoder may parse and acquire a VRP_use_flag syntax element from the bitstream. If the value of the VRP_use_flag syntax element is 1, the decoder may generate the virtual reference picture.

Also, the decoder may parse and acquire, from the bitstream, a VRP_pos_in_rps syntax element indicating the position of the virtual reference picture in the reference picture set. The VRP_pos_in_rps syntax element may be parsed an acquired only when the value of the VRP_use_flag syntax element is 1.

The decoder derives the motion vector of the current block in the current picture (S1020). The decoder may use one motion vector in the merge candidate list as the motion vector for the current block (in the case of the merge mode), or may derive the motion vector of the current block (in the case of the AMVP mode) by using one motion vector in the motion vector predictor candidate list as a motion vector predictor and adding an MVD acquired from the bitstream to the motion vector predictor. The information on the inter prediction mode may be acquired through the bitstream.

The decoder may construct a reference picture list including the virtual reference picture. In this case, the decoder may derive a reference picture index for the current block. The reference picture index may be derived based on the reference picture index of a merge candidate selected from the merge candidate list (in the case of the merge mode), or may parse and acquire a syntax element for the reference picture index from the bitstream. The reference picture list may include a plurality of original reference pictures and the virtual reference picture. In this case, the index of the virtual reference picture may have a lower value than the indices of the original reference picture. For example, the reference picture index indicating the virtual reference picture may be 0. Alternatively, the index of the virtual reference picture may have a higher value than the indices of the original reference pictures, based on RD costs.

Meanwhile, the decoder may parse and acquire a pu_VRP_use_flag syntax element from the bitstream. The reference picture list may include the original reference picture and the virtual reference picture. In this case, if the value of the pu_VRP_use_flag syntax element is 1, the reference picture index may indicate the virtual reference picture, and if the pu_VRP_use_flag syntax element is 0, the reference picture index may indicate the original reference picture.

The decoder generates prediction samples (or a prediction sample array) for the current block based on the derived motion vector for the current block and the virtual reference picture (S1030). The decoder may derive a reference block the motion vector indicates on the virtual reference picture, and use reconstructed samples in the reference block as prediction samples for the current block.

Although not shown, the decoder may receive information on residual samples for the current block from the bitstream. The information on the residual samples may include transform coefficients for the residual samples.

The decoder may derive residual samples (or a residual sample array) for the current block based on the information on the residual samples. The decoder may generate reconstructed samples based on the prediction samples and the residual samples, and derive a reconstructed block or reconstructed picture based on the reconstructed samples. Afterwards, as described above, the decoder may apply an in-loop filtering procedure such as deblocking filtering and/or SAO procedure to the reconstructed picture as required, in order to improve subjective/objective image quality.

According to the present invention set forth above, the performance of inter prediction may be increased based on a virtual reference picture which is more highly correlated with a current picture, thereby reducing the amount of data allocated to residual signals and improving the overall coding efficiency.

The above description is only an illustrative description of the technical idea of the present invention, and those having ordinary knowledge in the technical field, to which the present invention pertains, will appreciate that various changes and modifications may be made to the embodiments described herein without departing from the essential features of the present invention. Therefore, the embodiments disclosed in the present invention are intended not to limit but to describe the technical idea of the present invention, and thus do not limit the scope of the technical idea of the present invention. The protection scope of the present invention should be construed based on the appended claims, When the above-described embodiments are implemented in software, the above-described scheme may be implemented using a module (process or function) which performs the above function. The module may be stored in the memory and executed by the processor. The memory may be disposed to the processor internally or externally and connected to the processor using a variety of well-known means. The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices.

What is claimed is:

1. An inter prediction method which is performed by a decoding apparatus, the method comprising:
    configuring, by a processor, a reference picture set for a current picture;
    generating, by the processor, a virtual reference picture corresponding to an original reference picture in the reference picture set;
    deriving, by the processor, a motion vector for a current block in the current picture;
    generating, by the processor, a prediction sample for the current block on the basis of the motion vector and the virtual reference picture;
    constructing, by the processor, a reference picture list including the virtual reference picture; and
    deriving, by the processor, a reference picture index for the current block,
    wherein the reference picture index indicates the virtual reference picture on the reference picture list, and
    wherein, based on the reference picture list including a plurality of original reference pictures and the virtual reference picture, the reference picture index indicating the virtual reference picture has a lower value than indices of the original reference pictures or the reference picture index indicating the virtual reference picture is 0.

2. The method of claim 1, further comprising parsing, by the processor, a VRP_use_flag syntax element from a bitstream,
    wherein, if the value of the VRP_use_flag syntax element is 1, the virtual reference picture is generated.

3. The method of claim 1, wherein the virtual reference picture is generated based on a homography transform for the original reference picture.

4. The method of claim 3, wherein the homography transform is performed based on a homography matrix, and the homography matrix is derived based on the positional relationship between four corner pixels of the current picture and the corresponding pixels of the original reference picture.

5. The method of claim 4, further comprising acquiring, by the processor, VRP (virtual reference picture) information from the bitstream,
    wherein the virtual reference picture is generated based on the VRP information, and the VRP information includes positional information of the corresponding pixels.

6. The method of claim 5, wherein, when the first one of the four corner pixels is denoted by P1 and the first corresponding pixel corresponding to the first corner pixel is denoted by P2, the positional information of the corresponding pixels includes the differential value between P1 and P2.

7. The method of claim 3, further comprising acquiring, by the processor, VRP (virtual reference picture) information from the bitstream,
    wherein the virtual reference picture is generated based on the VRP information, the homography transform is performed based on a homography matrix, and the VRP information includes the coefficients of the homography matrix.

8. The method of claim 1, wherein the virtual reference picture is generated based on illumination compensation for the original reference picture.

9. The method of claim 8, further comprising acquiring, by the processor, VRP (virtual reference picture) information from the bitstream,
    wherein the virtual reference picture is generated based on the VRP information, and the VRP information includes a weight and offset for the illumination compensation.

10. The method of claim 1, further comprising parsing, by the processor, a pu_VRP_use_flag syntax element from the bitstream,
    wherein the reference picture list includes the original reference picture, and, if the value of the pu_VRP_use_flag syntax element is 1, the reference picture index indicates the virtual reference picture, and, if the value of the pu_VRP_use_flag syntax element is 0, the reference picture index indicates the original reference picture.

11. The method of claim 2, further comprising parsing, by the processor and from the bitstream, a VRP_pos_in_rps syntax element indicating the position of the virtual reference picture in the reference picture set,
    wherein the VRP_pos_in_rps syntax element is parsed if the value of the VRP_use_flag syntax element is 1.

12. A video encoding method which is performed by an encoding apparatus, the method comprising:
    configuring, by a processor, a reference picture set for a current picture;
    generating, by the processor, a virtual reference picture corresponding to an original reference picture in the reference picture set;
    deriving, by the processor, a motion vector for a current block in the current picture and a prediction sample on the basis of the virtual reference picture;
    deriving, by the processor, a residual sample on the basis of an original sample for the current block and the prediction sample;
    encoding and outputting, by the processor, information on the motion vector and information on the residual sample;
    constructing, by the processor, a reference picture list including the virtual reference picture; and
    deriving, by the processor, a reference picture index for the current block,
    wherein the reference picture index indicates the virtual reference picture on the reference picture list, and
    wherein, based on the reference picture list including a plurality of original reference pictures and the virtual reference picture, the reference picture index indicating the virtual reference picture has a lower value than indices of the original reference pictures or the reference picture index indicating the virtual reference picture is 0.

* * * * *